United States Patent
Kozel et al.

(10) Patent No.: US 11,005,240 B2
(45) Date of Patent: May 11, 2021

(54) THREE PHASE SWITCHGEAR OR CONTROL GEAR

(71) Applicant: ABB Schweiz AG, Baden (CH)

(72) Inventors: Tomas Kozel, Brno (CZ); Radek Javora, Hrusovany u Brna (CZ); Pavel Vrbka, Nedvedice (CZ); Josef Cernohous, Jamne nad Orlici (CZ); Christoph Budde, Heidelberg (DE); Christian Simonidis, Karlsruhe (DE); Harald Staab, Neckargemuend (DE); Sebastian Breisch, Neckarsteinach (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/718,242

(22) Filed: Dec. 18, 2019

(65) Prior Publication Data

US 2020/0203936 A1  Jun. 25, 2020

(30) Foreign Application Priority Data

Dec. 19, 2018  (EP) .................................... 18214196

(51) Int. Cl.
*H02B 13/035* (2006.01)
*H02B 13/02* (2006.01)
*H02B 13/00* (2006.01)

(52) U.S. Cl.
CPC ......... *H02B 13/0352* (2013.01); *H02B 13/02* (2013.01)

(58) Field of Classification Search
CPC .................................................. H02B 13/0352
See application file for complete search history.

(56) References Cited

U.S. PATENT DOCUMENTS

| 2006/0138088 | A1  | 6/2006 | Meinherz et al. |
| 2020/0203936 | A1* | 6/2020 | Kozel ................... H02B 13/02 |

FOREIGN PATENT DOCUMENTS

| DE | 19518126 A1  | 11/1996 |
| EP | 3421190 A1   | 1/2019 |
| EP | 3422501 A1   | 1/2019 |
| EP | 3422502 A1   | 1/2019 |
| EP | 3422503 A1   | 1/2019 |
| FR | 2620564 A1 * | 3/1989 | ............. H01H 33/64 |
| JP | 11146518 A * | 5/1999 |
| JP | 5546697 B1 * | 5/2014 |

* cited by examiner

*Primary Examiner* — Zachary Pape
(74) *Attorney, Agent, or Firm* — Leydig, Voit & Mayer, Ltd.

(57) ABSTRACT

A three phase switchgear or control gear includes: at least one compartment; a plurality of components for a first phase; a plurality of components for a second phase; and a plurality of components for a third phase. The plurality of components for the first phase, the second phase, and the third phase each include a connection to a main busbar, a circuit breaker actuator, a single phase circuit breaker pole, and a cable connection. The circuit breaker actuator and the single phase circuit breaker pole for the first phase are oriented along a first axis. The circuit breaker actuator and the single phase circuit breaker pole for the second phase are oriented along a second axis. The circuit breaker actuator and the single phase circuit breaker pole for the third phase are oriented along a third axis. The first axis, the second axis, and the third axis are inclined.

24 Claims, 2 Drawing Sheets

13. Space for human operators and maintainers
14. Arc proof sealed circuit breaker and main busbars space

THREE PHASE SWITCHGEAR OR CONTROL GEAR

CROSS-REFERENCE TO PRIOR APPLICATION

Priority is claimed to European Patent Application No. EP 18 214 196.0 filed on Dec. 19, 2018, the entire disclosure of which is hereby incorporated by reference herein.

FIELD

The present invention relates to a three phase switchgear or control gear for low voltage, medium voltage or high voltage use within a substation.

BACKGROUND

In state-of-art switchgear and control gear (also called controlgear) designs the primary circuits of the three phases are arranged parallel to each other. There is one common drive mechanism for the circuit breaker, one common drive for disconnector and one common drive for the earthing switch for all three phases.

This arrangement can be problematic for handling and maintenance purposes, and has associated risks of internal arc faults in the complete power circuit.

There is a need to address these issues.

SUMMARY

In an embodiment, the present invention provides a three phase switchgear or control gear, comprising: at least one compartment; a plurality of components for a first phase; a plurality of components for a second phase; and a plurality of components for a third phase, wherein the plurality of components for the first phase, the second phase, and the third phase each comprise a connection to a main busbar, a circuit breaker actuator, a single phase circuit breaker pole, and a cable connection, wherein the circuit breaker actuator and the single phase circuit breaker pole for the first phase are oriented along a first axis, wherein the circuit breaker actuator and the single phase circuit breaker pole for the second phase are oriented along a second axis, wherein the circuit breaker actuator and the single phase circuit breaker pole for the third phase are oriented along a third axis, wherein the first axis, the second axis, and the third axis are inclined to each other, and wherein the plurality of components for the first phase, the second phase, and the third phase are housed in the at least one compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
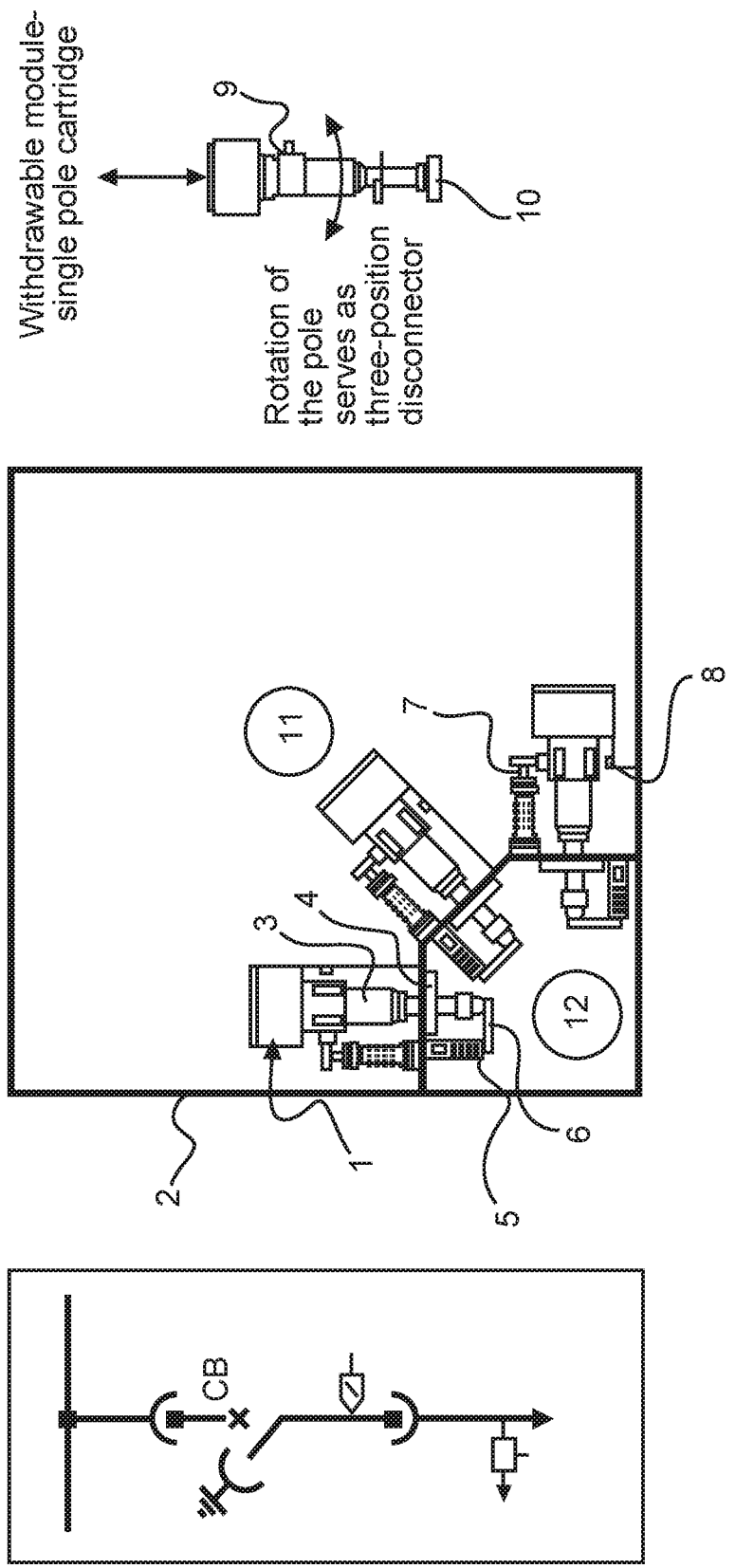
FIG. 1 shows an example of a three phase switchgear or control gear.

Therefore, it would be advantageous to have a better design of a switchgear or control gear.

In an aspect, there is provided a three phase switchgear or control gear, comprising:
  at least one compartment;
  a plurality of components for a first phase;
  a plurality of components for a second phase; and
  a plurality of components for a third phase.

The plurality of components for the first phase, the second phase and the third phase each comprise a connection to a main busbar, a circuit breaker actuator, a single phase circuit breaker pole, and a cable connection. The circuit breaker actuator and the single phase circuit breaker pole for the first phase are oriented along a first axis. The circuit breaker actuator and the single phase circuit breaker pole for the second phase are oriented along a second axis. The circuit breaker actuator and the single phase circuit breaker pole for the third phase are oriented along a third axis. The first axis, the second axis and the third axis are inclined to each other. The plurality of components for the first phase, the second phase and the third phase are housed in the at least one compartment.

In an example, the first axis is angled at 90 degrees to the third axis.

In an example, the second axis is symmetrically oriented with respect to the first axis and with respect to the third axis.

In an example, the second axis is angled at 45 degrees to the first axis.

In an example, the second axis is angled at 45 degrees to the third axis.

In an example, the first axis is horizontal the second axis is angled 45 degrees to the horizontal and the third axis is vertical.

In an example, the at least one compartment comprises at least two compartments. For the first phase, the second phase and the third phase the main busbar, the circuit breaker actuator, the single phase circuit breaker pole are housed in at least one first compartment of the at least two compartments.

In an example, the three cable connections are housed in a second compartment of the at least two compartments.

In an example, the first axis, the second axis and the third axis converge toward the second compartment.

In an example, the second compartment comprises a door or removable wall section. The switchgear or control gear is configured such that an operator can gain access to the inside of the second compartment via the door or removable wall section whilst the switchgear or control gear is in operation.

In an example, the second compartment is separated from an adjacent compartment of the at least one first compartment by an arc proof segregation.

In an example, for the first phase, the second phase and the third phase, rotation of the single phase circuit breaker pole for each phase is configured to function as a three position disconnector.

In an example, rotation of the single phase circuit breaker pole for each phase is configured for connection, disconnection and earthing functions.

In an example, the plurality of components for the first phase, the second phase and the third phase each comprise a pole rotation drive configured to rotate the corresponding single phase circuit breaker pole for each phase.

In an example, the plurality of components for the first phase, the second phase and the third phase each comprise a linear or rotational three position disconnector switch and a drive for the disconnector switch.

In an example, the plurality of components for the first phase the second phase and the third phase each comprise a vacuum interrupter located in a central axis of the single phase circuit breaker pole along the first, second and third axis for the corresponding phases. The three vacuum interrupters are configured for current interruption.

In an example, for the first phase, the second phase and the third phase, sets of bushings are used to connect the cable connections for each phase in the second compartment to components for each phase housed in the at least one first compartment.

In an example, current sensors and voltage sensors are embedded into each of the three sets of bushings.

In an example, the at least one first compartment comprises two compartments and the three circuit breaker actuators are housed in a first compartment of the two compartments.

In an example, the three main busbars and the three single phase circuit breaker poles are housed in a second compartment of the two compartments.

In an example, the first compartment within which the three circuit breaker actuators are housed comprises a door or removable wall section. The switchgear or control gear is configured such that an operator can gain access to the inside of the first compartment via the door or removable wall section whilst the switchgear or control gear is in operation.

In an example, the second compartment of the two compartments within which the three main busbars and the three single phase circuit breaker poles are housed is separated from the first compartment of the two compartments within which the three circuit breaker actuators are housed by an arc proof segregation.

In an example, current sensors and voltage sensors are embedded in each of the three single phase circuit breaker poles.

In an example, current sensors and voltage sensors are standalone sensors.

Figure 2:
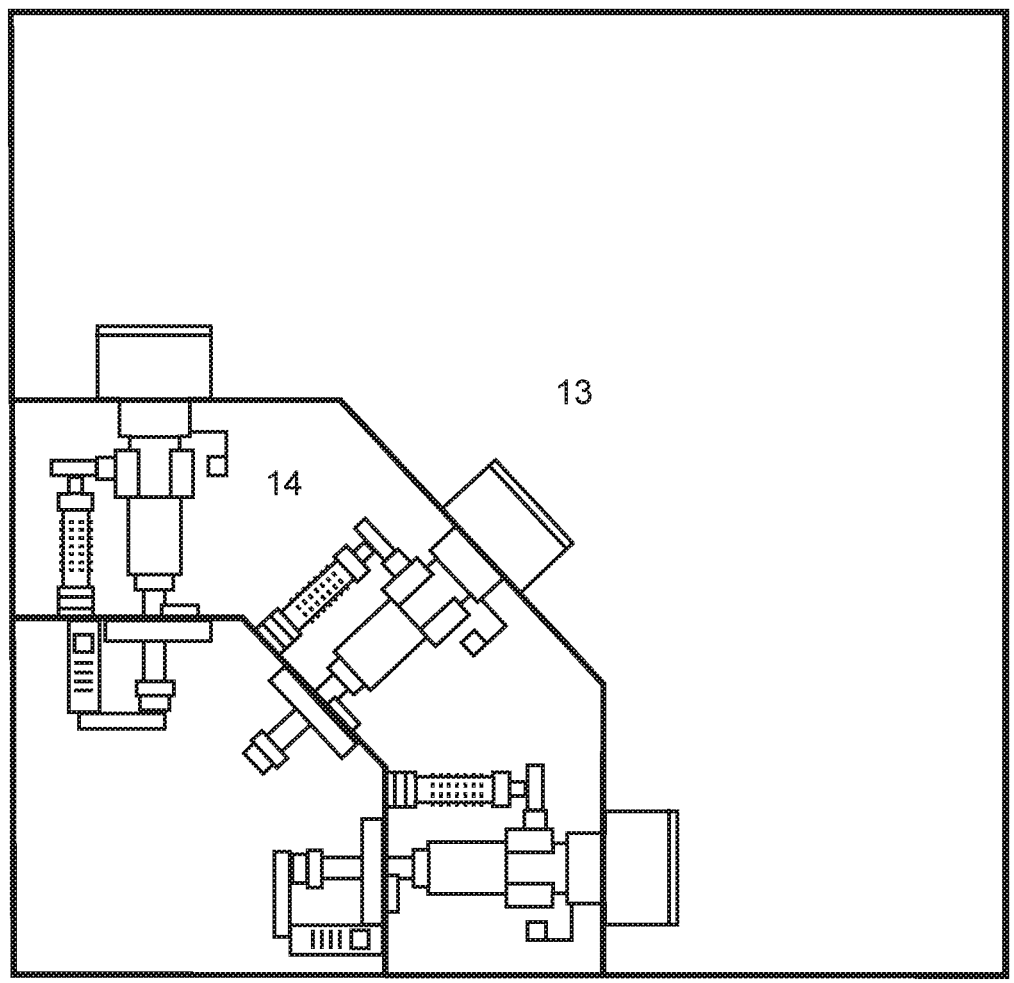
FIG. 2 shows an example of a three phase switchgear or control gear.

FIGS. 1-2 show examples of a switchgear or control gear for operation in a low voltage, medium voltage or high voltage substation.

One example relates to a three phase switchgear or control gear, comprising at least one compartment 2, 11, 12, 13, 14, a plurality of components for a first phase, a plurality of components for a second phase, and a plurality of components for a third phase. The plurality of components for the first phase, the second phase and the third phase each comprise a connection to a main busbar 7, a circuit breaker actuator 1, a single phase circuit breaker pole 3, and a cable connection 6. The circuit breaker actuator and the single phase circuit breaker pole for the first phase are oriented along a first axis. The circuit breaker actuator and the single phase circuit breaker pole for the second phase are oriented along a second axis. The circuit breaker actuator and the single phase circuit breaker pole for the third phase are oriented along a third axis. The first axis the second axis and the third axis are inclined to each other. The plurality of components for the first phase the second phase and the third phase are housed in the at least one compartment. Referring to FIG. 1 it can be seen that the circuit breaker poles for the three phases point in different directions, and the axes referred to above extend through the centre of these, converging in compartment 12.

According to an example, the first axis is angled at 90 degrees to the third axis.

According to an example, the second axis is symmetrically oriented with respect to the first axis and with respect to the third axis.

According to an example, the second axis is angled at 45 degrees to the first axis.

According to an example, the second axis is angled at 45 degrees to the third axis.

According to an example, the first axis is horizontal, the second axis is angled 45 degrees to the horizontal and the third axis is vertical.

According to an example, the at least one compartment comprises at least two compartments. For the first phase the second phase and the third phase the main busbar, the circuit breaker actuator, the single phase circuit breaker pole are housed in at least one first compartment 11, 13, 14 of the at least two compartments.

According to an example, the three cable connections are housed in a second compartment 12 of the at least two compartments.

According to an example, the first axis the second axis and the third axis converge toward the second compartment 12.

According to an example, the second compartment 12 comprises a door or removable wall section. The switchgear or control gear is configured such that an operator can gain access to the inside of the second compartment via the door or removable wall section whilst the switchgear or control gear is in operation.

According to an example, the second compartment 12 is separated from an adjacent compartment 11, 14 of the at least one first compartment by an arc proof segregation.

According to an example, for the first phase, the second phase and the third phase, rotation of the single phase circuit breaker pole for each phase is configured to function as a three position disconnector.

According to an example, rotation of the single phase circuit breaker pole for each phase is configured for connection, disconnection and earthing functions.

According to an example, the plurality of components for the first phase, the second phase and the third phase each comprise a pole rotation drive configured to rotate the corresponding single phase circuit breaker pole for each phase.

According to an example, the plurality of components for the first phase, the second phase and the third phase each comprise a linear or rotational three position disconnector switch and a drive for the disconnector switch.

According to an example, the plurality of components for the first phase, the second phase and the third phase each comprise a vacuum interrupter located in a central axis of the single phase circuit breaker pole along the first, second and third axis for the corresponding phases. The three vacuum interrupters are configured for current interruption.

According to an example, for the first phase, the second phase and the third phase, sets of bushings are used to connect the cable connections for each phase in the second compartment 12 to components for each phase housed in the at least one first compartment 11, 13, 14.

According to an example, current sensors 4 and voltage sensors 5 are embedded into each of the three sets of bushings.

According to an example, the at least one first compartment comprises two compartments. The three circuit breaker actuators are housed in a first compartment 13 of the two compartments.

According to an example, the three main busbars and three single phase circuit breaker poles are housed in a second compartment 14 of the two compartments.

According to an example, the first compartment 13 within which the three circuit breaker actuators are housed comprises a door or removable wall section. The switchgear or control gear is configured such that an operator can gain access to the inside of the first compartment 13 via the door or removable wall section whilst the switchgear or control gear is in operation.

According to an example, the second compartment 14 of the two compartments within which the three main busbars and the three single phase circuit breaker poles are housed is separated from the first compartment 13 of the two compartments within which the three circuit breaker actuators are housed by an arc proof segregation.

According to an example, current sensors 4 and voltage sensors 5 are embedded in each of the three single phase circuit breaker poles.

According to an example, current sensors 4 and voltage sensors 5 are standalone sensors.

Thus, a new substation development is provided, where three phase switchgear or control gear have arrangements of the primary circuits that are separated phase by phase, and wherein those phases are angled to each other. This enables the drives of all switching devices to be designed as single phase only and thus avoiding the need for a parallel arrangement. Having the drives per single phase (i.e. tripling the number of needed drives) the primary circuits of each phase can be arranged in much more compact way bringing substantial material and assembly work savings, while the phase-to-phase distance increases significantly. There is also improved behavior of the switchgear or control gear in many operational aspects.

The new design is applicable to both human operated switchgear and control gear as well as the switchgear or control gear with unmanned operation and maintenance.

To put this another way, all the current state-of-art switchgear and control gear design have primary circuits that are grouped per feeder and where the different phases are arranged parallel to each other. However, for the new design described here it has been found to be advantageous for the switchgear or control gear to move to phase by phase arrangement on the primary circuits, and where those phases are angled to each other. This arrangement reduces the number of components on primary circuits to a minimum, decreases the risk of internal arc faults in the main busbars and circuit breaker area and allows modularization of the components to single phase pole and drive cartridges. This facilitates better handling by human or automation maintenance systems (lower weight and dimensions compared to today's three phase devices).

Continuing with the figures, specific features are now described.

FIG. 1 shows a detailed example of a three phase switchgear or control gear, where for ease of reference the following features shown are listed:
1. Circuit breaker phase actuator with auxiliary circuits, pole rotation drive and auxiliaries;
2. Arc proof enclosure;
3. Main circuit breaker pole with rotational functionality, shown in a connected position to the main busbar, thus a rotation of the pole enables disconnection or earthing;
4. Current sensor of a ring type, one per phase;
5. Voltage sensor in a post insulator, one per phase;
6. Cable connections—copper;
7. Main busbars;
8. Earth copper;
9. Sliding contact—plier type;
10. Rosette to pin contact;
11. Space for robotic maintenance system in the same room with main busbars and circuit breaker poles;
12. Cable connection compartment, that is arc proof and segregated from space 11 and with side walls for segregation between feeders; accessible after removing the removable cover shown in the bottom left hand corner.

As shown in FIG. 1 the primary circuits of the different phases of a three phase switchgear or control gear are in a phase by phase arrangement, and where the phase by phase arrangement is angled one to the other. This has the advantage that all phases meet in a compact cable termination compartment, where a three core cable can be easily split to cores and the cores terminated at approximately the same length. The following further advantages can be gained:
1. Limiting the number of components and the total length of the primary circuits to a minimum;
2. Decreasing the risk of phase-to-phase internal arc faults in main busbars and circuit breaker area by increasing the distance between phases and providing earthed metallic segregation between phases if required; and
3. Modularization of the switchgear or controlgear components to single phase pole and drive cartridges with lower weight and dimensions compared to complete three phase devices, thereby providing for easier handling by an automated maintenance system or human maintainers.

As shown in FIG. 1, the arrangement of the non-parallel axes has one phase in a vertical direction, a second phase tilted at 45° from vertical and the third phase in a horizontal direction. Other arrangements are possible. All the phases meet in a common cable compartment, where a three core incoming or outgoing cable can then be easily terminated. The cable compartment is segregated from the main busbars and circuit breaker space by an arc proof segregation, and is a human operator accessible compartment of the switchgear or controlgear with unmanned operation. A cable compartment of one feeder is segregated from the cable compartments of other feeders by sidewalls, not shown for ease of visibility.

Considering a single pole circuit breaker it has been found to be advantageous to merge both the circuit breaking and disconnecting function into a cartridge. A rotational circuit breaker pole can be used. The vacuum interrupter located in the central axis of the pole is used for current interruption, while rotation of the pole around the central axis serves for connection, disconnection and earthing as a three position disconnector switch.

However, the rotational pole 3 shown in FIG. 1 can be replaced with a non-rotational pole in combination with a linear or rotational three position disconnector switch. The pole rotation drive in circuit breaker single phase actuator 1 is then replaced by a drive for the disconnector switch.

Continued with the detailed embodiment shown in FIG. 1, the CB pole cartridge 3 protrudes from the circuit breaker and main busbar space 11 into the cable compartment 12. However, to facilitate arc proofing of the cable compartment with respect to the circuit breaker and main busbar space, the CB pole cartridge can be located fully in the circuit breaker and main busbar space. Circuit transition to the cable compartment can then be provided by bushing allowing better sealing. This bushing can have embedded current 4 and voltage sensors 5, and these components then being integrated into the bushing instead of stand alone ones.

The circuit breaker cartridge 3 shown in FIG. 1 includes the circuit breaker pole, disconnector and the associated drives and auxiliaries. The cartridge can also include the current and voltage sensors.

The switchgear and control gear of FIG. 1, generally relates to switchgear or controlgear with unmanned operation. FIG. 2 shows a detailed example utilizing the same principles as described with respect to FIG. 1, but now for a human operated and maintained switchgear. This is achieved by adding an arc proof segregation covering the circuit breaker and main busbars space 14, thereby creating a human accessible space 13 for maintenance and operation personnel.

It is to be noted that the removable cover of the cable termination compartment can be replaced with doors.

The primary circuit can include other components and devices not described in FIG. 1, such as earthing switch, voltage indication, surge arrestors, Ultra Fast Earthing Switch (UFES), IS-limiters (as invented by ABB Calor Emag in 1955), contactors, load-break switches, fuses.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A three phase switchgear or control gear, comprising:
   at least one compartment;
   a plurality of components for a first phase;
   a plurality of components for a second phase; and
   a plurality of components for a third phase,
   wherein the plurality of components for the first phase, the second phase, and the third phase each comprise a main busbar, a circuit breaker actuator, a single phase circuit breaker pole, a cable connection, and a connection to the respective main busbar,
   wherein the circuit breaker actuator and the single phase circuit breaker pole for the first phase are oriented along a first axis,
   wherein the circuit breaker actuator and the single phase circuit breaker pole for the second phase are oriented along a second axis,
   wherein the circuit breaker actuator and the single phase circuit breaker pole for the third phase are oriented along a third axis,
   wherein the first axis, the second axis, and the third axis are inclined to each other, and
   wherein the plurality of components for the first phase, the second phase, and the third phase are housed in the at least one compartment.

2. The switchgear or control gear according to claim 1, wherein the first axis is angled at 90 degrees to the third axis.

3. The switchgear or control gear according to claim 1, wherein the second axis is symmetrically oriented with respect to the first axis and with respect to the third axis.

4. The switchgear or control gear according to claim 1, wherein the second axis is angled at 45 degrees to the first axis.

5. The switchgear or control gear according to claim 1, wherein the second axis is angled at 45 degrees to the third axis.

6. The switchgear or control gear according to claim 1, wherein the first axis is horizontal, the second axis is angled 45 degrees to the horizontal, and the third axis is vertical.

7. The switchgear or control gear according to claim 1, wherein the at least one compartment comprises at least two compartments, and wherein for the first phase, the second phase, and the third phase, the main busbar, the circuit breaker actuator, and the single phase circuit breaker pole are housed in at least one first compartment of the at least two compartments.

8. The switchgear or control gear according to claim 7, wherein the three cable connections are housed in a second compartment of the at least two compartments.

9. The switchgear or control gear according to claim 8, wherein the first axis, the second axis, and the third axis converge toward the second compartment.

10. The switchgear or control gear according to claim 8, wherein the second compartment comprises a door or removable wall section, and
    wherein the switchgear or control gear is configured such that an operator can access an inside of the second compartment via the door or removable wall section whilst the switchgear or control gear is in operation.

11. The switchgear or control gear according to claim 8, wherein the second compartment is separated from an adjacent compartment of the at least one first compartment by an arc proof segregation.

12. The switchgear or control gear according to claim 1, wherein for the first phase, the second phase, and the third phase, rotation of the single phase circuit breaker pole for each phase is configured to function as a three position disconnector.

13. The switchgear or control gear according to claim 12, wherein rotation of the single phase circuit breaker pole for each phase is configured for connection, disconnection, and earthing functions.

14. The switchgear or control gear according to claim 12, wherein the plurality of components for the first phase, the second phase, and the third phase each comprise a pole rotation drive configured to rotate a corresponding single phase circuit breaker pole for each phase.

15. The switchgear or control gear according to claim 1, wherein the plurality of components for the first phase, the second phase, and the third phase each comprise a linear or rotational three position disconnector switch and a drive for the disconnector switch.

16. The switchgear or control gear according to claim 1, wherein the plurality of components for the first phase, the second phase, and the third phase each comprise a vacuum interrupter located in a central axis of the single phase circuit breaker pole along the first, second, and third axis for corresponding phases, and wherein the three vacuum interrupters are configured for current interruption.

17. The switchgear or control gear according to claim 8, wherein for the first phase, the second phase, and the third phase, sets of bushings connect the cable connections for each phase in the second compartment to components for each phase housed in the at least one first compartment.

18. The switchgear or control gear according to claim 17, wherein current sensors and voltage sensors are embedded into each of the three sets of bushings.

19. The switchgear or control gear according to claim 7, wherein the at least one first compartment comprises two compartments, and
wherein the three circuit breaker actuators are housed in a first compartment of the two compartments.

20. The switchgear or control gear according to claim 19, wherein the three main busbars and the three single phase circuit breaker poles are housed in a second compartment of the two compartments.

21. The switchgear or control gear according to claim 19, wherein the first compartment within which the three circuit breaker actuators are housed comprises a door or removable wall section, and
wherein the switchgear or control gear is configured such that an operator can access an inside of the first compartment via the door or removable wall section whilst the switchgear or control gear is in operation.

22. The switchgear or control gear according to claim 20, wherein the second compartment of the two compartments within which the three main busbars and the three single phase circuit breaker poles are housed is separated from the first compartment of the two compartments within which the three circuit breaker actuators are housed by an arc proof segregation.

23. The switchgear or control gear according to claim 1, wherein current sensors and voltage sensors are embedded in each of the three single phase circuit breaker poles.

24. The switchgear or control gear according to claim 23, wherein the current sensors and the voltage sensors comprise standalone sensors.

* * * * *